US011921450B2

(12) United States Patent
Tsukada

(10) Patent No.: US 11,921,450 B2
(45) Date of Patent: Mar. 5, 2024

(54) IMAGE FORMING APPARATUS THAT CONVEYS A RECORDING MATERIAL FASTER WHEN VARNISH COATING IS PERFORMED

(71) Applicant: Canon Kabushiki Kaisha, Tokyo (JP)

(72) Inventor: Yoshiro Tsukada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/969,011

(22) Filed: Oct. 19, 2022

(65) Prior Publication Data

US 2023/0125938 A1 Apr. 27, 2023

(30) Foreign Application Priority Data

Oct. 21, 2021 (JP) ................................ 2021-172135

(51) Int. Cl.
*G03G 15/20* (2006.01)

(52) U.S. Cl.
CPC ..... *G03G 15/2096* (2013.01); *G03G 15/2064* (2013.01); *G03G 15/2098* (2021.01); *G03G 2215/00801* (2013.01)

(58) Field of Classification Search
USPC .......................................................... 399/320
See application file for complete search history.

(56) References Cited

U.S. PATENT DOCUMENTS 9,959,492 B2 5/2018 Saito
2012/0051815 A1* 3/2012 Satomi ................ G03G 15/234 399/341
2023/0073009 A1* 3/2023 Yamamoto ......... G03G 15/6585
2023/0127091 A1* 4/2023 Kitajima ............. G03G 15/221 399/1

FOREIGN PATENT DOCUMENTS

JP 2011145314 A 7/2011
JP 2016224111 A 12/2016

* cited by examiner

*Primary Examiner* — Quana Grainger
(74) *Attorney, Agent, or Firm* — Venable LLP

(57) ABSTRACT

An image forming apparatus includes an image forming unit, a fixing unit, a varnish coater, and a controller. When a first image forming job in which a toner image is formed to a first recording material and varnish is not applied is executed, the controller controls conveyance of the first recording material at a fixing nip portion such that a conveyance speed of the first recording material at the fixing nip portion is a first conveyance speed. When a second image forming job in which a toner image is formed to a second recording material of which a grammage is the same as a grammage of the first recording material and varnish is applied is executed, the controller controls conveyance of the second recording material at the fixing nip portion such that the second recording material is conveyed at a second conveyance speed faster than the first conveyance speed.

6 Claims, 10 Drawing Sheets

FIG.7

| PAPER TYPE | GRAMMAGE | NORMAL MODE | | VARNISH MODE | |
|---|---|---|---|---|---|
| | g/m 2 | mm/s | °C | mm/s | °C |
| PLAIN PAPER | 50-90 | 350 | 185 | - | - |
| COATED PAPER 1 | 106-150 | 250 | 185 | 350 | 185 |
| COATED PAPER 2 | 151-180 | 250 | 190 | 350 | 190 |
| COATED PAPER 3 | 181-220 | 160 | 180 | 250 | 180 |
| COATED PAPER 4 | 221-300 | 160 | 190 | 250 | 190 |

FIG.8

| PAPER TYPE | GRAMMAGE | NORMAL MODE | | VARNISH MODE | |
|---|---|---|---|---|---|
| | g/m² | mm/s | ℃ | mm/s | ℃ |
| PLAIN PAPER | 50-90 | 350 | 185 | - | - |
| COATED PAPER 1 | 106-150 | 250 | 185 | 350 | 185 |
| COATED PAPER 2 | 151-180 | 250 | 190 | 350 | 190 |
| COATED PAPER 3 | 181-220 | 160 | 180 | 250 | 180 |
| COATED PAPER 4 | 221-300 | 160 | 190 | 250 | 190 |
| COATED PAPER 5 | 301-350 | - | - | 160 | 190 |

IMAGE FORMING APPARATUS THAT CONVEYS A RECORDING MATERIAL FASTER WHEN VARNISH COATING IS PERFORMED

BACKGROUND OF THE INVENTION

Field of the Invention

The present invention relates to an image forming apparatus including an image forming unit for forming a toner image on a recording material and a varnish coater for applying varnish on the recording material to which the toner image has been formed.

DESCRIPTION OF THE RELATED ART

There has been proposed an image forming apparatus equipped with an image forming unit for forming a toner image on a recording material and a varnish coating apparatus, so-called a varnish coater, for applying varnish to the recording material to which the toner image has been formed (Japanese Patent Application Laid-Open Publication No. 2016-224111). In the example of the image forming apparatus disclosed in Japanese Patent Application Laid-Open Publication No 2016-224111, glossiness of toner is improved by applying varnish to the recording material using the varnish coater compared to the case where varnish is not applied.

Further, there has been proposed an image forming apparatus capable of adjusting fixing conditions in the fixing apparatus such that thermal energy applied to toner is increased then during normal printing in a case where application of varnish by a varnish coater has not been selected (Japanese Patent Application Laid-Open Publication No. 2011-145314).

In the image forming unit, heat and pressure is applied to the recording material to fix the toner image, and in order to fix the toner appropriately and to apply glossiness to the toner, a heating value for fixing the toner image is controlled according to a grammage of the recording material when fixing the toner image. In that case, a recording material having a huge grammage absorbs heat easily compared to a recording material having a small grammage, such that a greater heating value must be applied thereto compared to the recording material having a small grammage. Therefore, in the image forming unit, temperature of the heat applied during fixing, which is called a fixing temperature, is increased, or a conveyance speed of the recording material during fixing is reduced. Hitherto, even in the case of an image forming apparatus equipped with an image forming unit and a varnish coater, the conveyance speed of the recording material was delayed in order to increase the heating value according to the grammage of the recording material, such that productivity of printed matter might be deteriorated.

SUMMARY OF THE INVENTION

According to a first aspect of the present invention, an image forming apparatus includes an image forming unit configured to form a toner image on a recording material, a fixing unit configured to fix the toner image on the recording material at a fixing nip portion in which the recording material is nipped and conveyed, a varnish coater configured to apply varnish to the recording material passed through the fixing nip portion, and a controller. In a case where a first image forming job in which a toner image is formed to a first recording material and varnish is not applied by the varnish coater is executed, the controller is configured to control conveyance of the first recording material at the fixing nip portion such that a conveyance speed of the first recording material at the fixing nip portion is a first conveyance speed. In a case where a second image forming job in which a toner image is formed to a second recording material of which a grammage is the same as a grammage of the first recording material and varnish is applied by the vanish coater is executed, the controller is configured to control conveyance of the second recording material at the fixing nip portion such that the second recording material is conveyed at a second conveyance speed that is faster than the first conveyance speed at the fixing nip portion.

Further features of the present invention will become apparent from the following description of exemplary embodiments with reference to the attached drawings.

BRIEF DESCRIPTION OF THE DRAWINGS

FIG. 7 is a view illustrating a fixing condition table.

FIG. 8 is a view illustrating another embodiment of a fixing condition table.

DESCRIPTION OF THE EMBODIMENTS

Image Forming System

Figure 1:
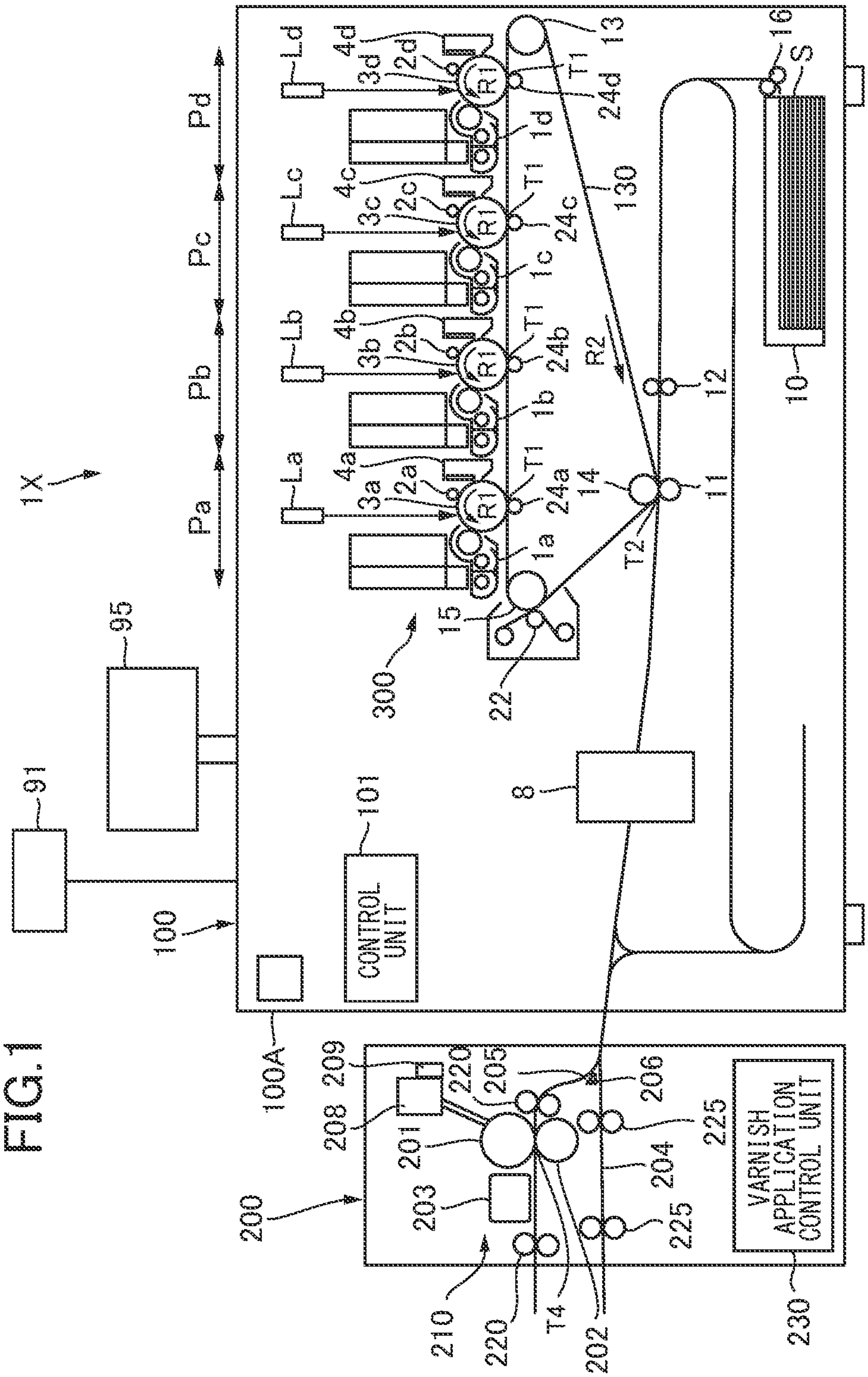
FIG. 1 is a schematic diagram illustrating an image forming system according to a present embodiment.

An image forming system according to a present embodiment will be described with reference to the drawings. As illustrated in FIG. 1, an image forming system 1X according to the present embodiment includes a printer 100 for forming a toner image on a recording material S, and a varnish applying apparatus, hereinafter referred to as varnish water 200 connected to the printer 100 for coating varnish to the recording material S to which toner image has been fixed by the printer 100. That is, the image forming system 1X is an example of an image forming apparatus, which is an in-line system in which the recording material S to which toner image has been formed is conveyed automatically from the printer 100 to the vanish coater 200, and which is capable of performing an image forming process and a varnish application process to the recording material S consistently in response to an entry of an image forming job.

The varnish coater 200 is designed to be connected to the printer 100 as one of peripheral devices, also referred to as optional units, that can be retrofitted to the printer 100 with the aim to expand the functions thereof. The varnish coater

200 is capable of applying varnish as surface processing to the recording material S discharged from an apparatus body 100A with the aim to apply glossiness and surface protection for providing added value to the recording material S, for example. The varnish coater 200 will be described in detail below.

The printer 100 will be described with reference to FIGS. 1 and 2. The printer 100 is a tandem-type full-color printer adopting an electrophotographic system. The printer 100 includes image forming units Pa, Pb, Pc, and Pd respectively forming color images of yellow magenta, cyan, and black. The printer 100 forms a toner image on the recording material S based on an image signal from a document reading apparatus (not shown) connected to the apparatus body 100A or an external apparatus 91 such as a personal computer that is connected to the apparatus body 100A in a manner capable of communicating signals therewith.

According to the present embodiment, an image forming unit 300 for forming a toner image on a recording material S is composed of image forming units Pa to Pd, primary transfer rollers 24*a* to 24*d*, an intermediate transfer belt 130, a plurality of rollers 13 to 15, and a secondary transfer outer roller 11. Further, various types of sheet materials, such as paper material including plain paper, thick paper, rough paper, uneven paper, and coated paper, plastic films, and cloth, can be used as the recording material S.

As illustrated in FIG. 1, the image forming units Pa, Pb, Pc. and Pd are aligned along a direction of movement of the intermediate transfer belt 130 within the apparatus body 100A. The intermediate transfer belt 130 is stretched across the plurality of rollers (13, 14, and 15) and configured to rotate in a direction of arrow R2. The intermediate transfer belt 130 is configured to bear and convey a toner image that has been primarily transferred thereto. The secondary transfer outer roller 11 is arranged at a position opposed to a secondary transfer inner roller 14 supporting and stretching the intermediate transfer belt 130 with the intermediate transfer belt 130 interposed therebetween, and constitutes a secondary transfer portion T2 where the toner image on the intermediate transfer belt 130 is transferred to the recording material S. A fixing apparatus 8 is arranged downstream in a recording material conveyance direction of the secondary transfer portion T2. The fixing apparatus 8, i.e., fixing unit, dill be described in detail below.

A cassette 10 storing the recording material S is arranged in a lower part of the printer 100. The recording material S is conveyed by a conveyance roller 16 from the cassette 10 toward a registration roller 12. Thereafter, the registration roller 12 is started to be rotated in synchronization with the toner image formed on the intermediate transfer belt 130 as described below by which the recording material S is conveyed to the secondary transfer portion T2. Only one cassette 10 is illustrated, but a plurality of cassettes 10 capable of storing different types of recording materials S having various sizes and thicknesses can be provided, in which case the recording material S is conveyed selectively from one of the plurality of cassettes 10. Further, not only the recording material S stored in the cassette 10 but also the recording material S supported on a manual sheet feed portion (not shown) can be conveyed.

The four image forming units Pa, Pb, Pc, and Pd arranged in the printer 100 have substantially the same configuration except for the difference in the colors being developed. In the following description, an image forming unit Pa for developing a yellow image is described as an example, and the descriptions of other image forming units Pb, Pc, and Pd are omitted.

A cylindrical photosensitive drum 3*a* serving as a photosensitive member is arranged in the image forming unit Pa. The photosensitive drum 3*a* is driven to rotate in an arrow R1 direction. A charging unit 2*a*, an exposing unit La, a developing unit 1*a*, a primary transfer roller 24*a*, and a drum cleaning device 4*a* are arranged in a circumference of the photosensitive drum 3*a*.

A process for forging a full-color image by the printer 100 will be described as an example. At first, in a state where an image forming operation is started, a surface of the rotating photosensitive drum 3*a* is charged uniformly by the charging unit 2*a*. The charging unit 2*a* is, for example, a corona charger that irradiates charged particles by corona discharge to charge the photosensitive drum 3*a* to a uniform negative dark potential. Next, the photosensitive drum 3*a* is scanned and exposed by laser light emitted from the exposing unit La corresponding to image signals. Thereby, an electrostatic latent image corresponding to image signals is formed on the photosensitive drum 3*a*. The electrostatic latent image formed on the photosensitive drum 3*a* is developed as a toner image, which is a visible image, using developer containing toner and carrier stored in the developing unit 1*a*. According to the present embodiment, the developing units 1*a* to 1*d* respectively use two-component developer containing nonmagnetic toner and magnetic carrier. Toner having a low melting point and containing binding resin, coloring agent, and wax as a releasing agent is used.

The toner image formed on the photosensitive drum 3*a* is primarily transferred to the intermediate transfer belt 130 at a primary transfer portion T1 formed between the intermediate transfer belt 130 and the primary transfer roller 24*a* arranged in a manner interposing the intermediate transfer belt 130. In this state, a primary transfer voltage is applied to the primary transfer roller 24*a* The toner remaining on the surface of the photosensitive drum 3*a* after primary transfer is removed by the drum cleaning device 4*a*.

The above-described operation is performed sequentially in each of the image forming units Pa to Pd corresponding to yellow, magenta, cyan, and black, and the toner images of four colors are superposed on the intermediate transfer belt 130. Thereafter, at a matched timing with the formation of toner images, the recording material S stored in the cassette 10 is conveyed to the secondary transfer portion T2. Then, by applying a secondary transfer voltage to the secondary transfer outer roller 11, a full-color toner image formed on the intermediate transfer belt 130 is collectively secondarily transferred to the recording material S. The toner remaining on the intermediate transfer belt 130 after secondary transfer is removed by a belt cleaning device 22.

Next, the recording material S to which the toner image has been transferred is conveyed to the fixing apparatus 8. In the fixing apparatus 8, the recording material S bearing the toner image is nipped and conveyed at a fixing nip portion T3 composed of a fixing belt 40 and a pressing belt 41, and heat and pressure is applied to the recording material S (refer to FIG. 2 described below). The toner of the toner image borne on the recording material S is melted and mixed by the heat and pressure applied in this manner, and the toner image is fixed on the recording material S as a full-color image.

Fixing Apparatus

The fixing apparatus 8 will be described in detail with reference to FIG. 2. The fixing apparatus 8 illustrated in FIG. 2 includes the fixing belt 40 which is an endless belt serving as an example of a first rotary member, and the pressing belt 41 which is also an endless belt serving as an example of a second rotary member and forming the fixing nip portion T3 by contacting with the fixing belt 40. An outer circumference surface of the pressing belt 41 is contacted with an outer circumference surface of the fixing belt 40, by which the fixing nip portion T3 for nipping, conveying, and applying heal and pressure to the recording material S is formed. Further, the fixing apparatus 8 includes a heater 42*a* for heating the fixing belt 40, and a temperature sensor 49 serving as an example of a temperature detection unit that detects a temperature of the fixing belt 40. A main control unit 101 described below controls the heater 42*a* such that the temperature of the fixing belt 40 is the same temperature during execution of a first image forming job and during execution of a second image forming job.

The fixing belt 40 includes a base layer formed of polyimide having a longitudinal width of 360 mm in a longitudinal direction orthogonal to a conveyance direction, that is, arrow Z direction, of the recording material S, an inner diameter of 50 mm, and a thickness of 75 μm, and an elastic layer having a thickness of 400 μm formed on an outer circumference of the base layer, for example. A known elastic material can be used as the material of the elastic layer, such as a silicone rubber or a fluororubber. The present embodiment uses silicone rubber with a hardness of JIS-A20 degrees and a thermal conductivity of 0.8 W/mK. Further, fluororesin layer, such as PFA or PTFE, having a thickness of 30 μm is disposed as a surface release layer on the outer circumference of the elastic layer.

The fixing belt 40 is stretched across a heating roller 42 and a driving roller 43. The heating roller 42 is a hollow roller made of iron with a thickness of 1 mm having a longitudinal width of 365 mm, an outer diameter of 20 mm, and an inner diameter of 18 mm, for example, and in an interior thereof is arranged the heater 42*a* serving as a heating unit. The heating roller 42 also functions as a tension roller, which is urged by an urging unit such as a spring not shown and applies a predetermined tension to the fixing belt 40.

The driving roller 43 has a function as a driving roller for driving the fixing belt 40. The driving roller 43 is a rubber roller having a high frictionality in which a silicon rubber layer serving as a surface elastic layer is provided on a core bar made of iron alloy having a longitudinal width of 365 mm, an outer diameter of 20 mm, and a diameter of 16 mm, for example. The driving roller 43 is driven to rotate by a motor 80 serving as a driving unit. By providing an elastic layer as described above, a driving force entered from the motor 80 via a drive gear chain not shown can be transmitted to the fixing belt 40 preferably without causing any slipping. Further, during the fixing process, a pressure tension roller 46 described below is pressed toward the driving roller 43 via the fixing belt 40 and the pressing belt 41, such that a rubber layer of the driving roller 43 is dented by a predetermined amount. As a result, the fixing nip portion T3 for ensuring separativeness of the recording material S from the fixing belt 40 is formed.

The temperature sensor 49 for detecting a temperature of the fixing belt 40 is arranged on an inner circumference side of the fixing belt 40. Further, a fixing pad 44 serving as a first pressure pad for pressing the fixing belt 40 toward the pressing belt 41 is arranged in the inner circumference side of the fixing belt 40 in a noncontact manner with the driving roller 43. According to the present embodiment, a minute gap between the driving roller 43 and the fixing pad 44 at a most approximated portion is set to 2 min, for example. The fixing pad 44 is composed of a heat-resistant silicone rubber serving as an elastic body having a thickness of 3 mm and a lateral width of 12 mm, for example.

The fixing pad 44 as described above includes a cover having low slidability in which a cloth made of polyimide is coated with fluororesin to reduce frictional resistance with an inner circumference surface of the fixing belt 40 that moves in sliding motion. The cover is provided to cover the silicone rubber surface having high frictionality of the fixing pad 44. Therefore, the cover sliding against an inner surface of a heating belt suppresses driving torque of the driving roller 43 and enables the fixing belt 40 to rotate stably without causing increase in size of the motor.

The driving roller 43 described above is arranged at a position pressed by both the pressure tension roller 46 and a pressure pad 47 described below. Thereby, a gap formed between the pressure pad 47 and the pressure tension roller 46 can be backed up by the driving roller 43. Since the gap formed between the driving roller 43 and the fixing pad 44 is backed up by the pressure pad 47, the gaps between the roller and the pad will not overlap, and no significant depressurization in the recording material conveyance direction, that is, direction of rotation of the fixing belt 40, in the fixing nip portion T3 will not occur.

The pressing belt 41 includes a base layer formed of polyimide having a longitudinal width of 340 mm, an inner diameter of 50 mm, and a thickness of 75 μm, an elastic layer having a thickness of 300 μm, and a surface formed of a fluororesin PFA tube having a thickness of 30 μm serving as a release layer disposed on a surface, for example. The pressing belt 41 is stretched across a tension roller 45 and the pressure tension roller 46, and abuts against the fixing belt 40 to thereby rotate following the movement of the fixing belt 40.

The tension roller 45 includes a core bar made of iron alloy having a longitudinal width of 350 mm, an outer diameter of 20 mm, and a diameter of 16 mm, and a silicone sponge layer having reduced thermal conductivity disposed thereon such that thermal conduction from the pressing belt 41 is reduced. The pressure tension roller 46 is a rigid roller having a low slidability that is made of iron alloy having a thickness of 2 mm, a longitudinal width of 350 mm, an outer diameter of 20 mm, and an inner diameter of 16 mm, for example.

The pressure pad 47 that presses the pressing belt 41 toward the fixing belt 40 is arranged on the inner circumference side of the pressing belt 41 in contact with the pressure tension roller 46. In order to form the fixing nip portion T3 serving as an image heating nip, the pressure tension roller 46 has its both end portions of the rotation shaft apply pressure with a predetermined pressurizing force toward the driving roller 43 by a pressurization mechanism (not shown). The pressure of the fixing nip portion T3 is set to be maximum at the area stretched across the pressure tension roller 46.

In order to form a continuous pressurizing force distribution without any depressurization portion at the fixing nip portion T3 along the recording material conveyance direction, a downstream edge of the pressure pad 47 is disposed in a wedge-shaped space between an inner circumference of the pressing belt 41 and the pressure tension roller 46. That is, the pressure pad 47 is arranged to be in contact with the pressure tension roller 46.

The pressure pad 47 is thrilled of a heat-resistant silicone rubber serving as an elastic body having a thickness of 3 mm and a lateral width of 15 mm and a stay made of SUS that supports the elastic body from a lower side. A sliding sheet (not shown) in which a film made of polyimide serving as a low slidability sheet is coated with fluororesin is disposed on the surface of the pressure pad 47 to reduce frictional resistance with the inner circumference surface of the pressing belt 41 that slides against the pressure pad 47. The sliding sheet has a longitudinal width of 355 mm and a thickness of 70 μm, for example. A downstream-side leading edge of the sliding sheet is folded back such that it is easily inserted to the wedge-shaped space. The driving torque of the driving roller 43 is suppressed by the sliding sheet, such that the pressing belt 41 can be rotated stably.

In the fixing apparatus 8, a width, that is, lateral width, of the fixing nip portion T3 between the fixing belt 40 and the pressing belt 41 in the recording material conveyance direction, that is, arrow Z direction, is set to approximately 18 mm, for example. By ensuring a lateral width of the fixing nip portion T3, even if the image forming speed is increased, the fixing of toner image on the recording material S and adjustment of glossiness is enabled. Further, reduction of heat capacity is realized by adopting endless belts for both the heating side and pressurizing side members related to heating. As a result, reduction of warm-up time, that is, lime required for the printer 100 to be ready to perform fixing from the time a main power switch is turned on, is realized.

Figure 2:
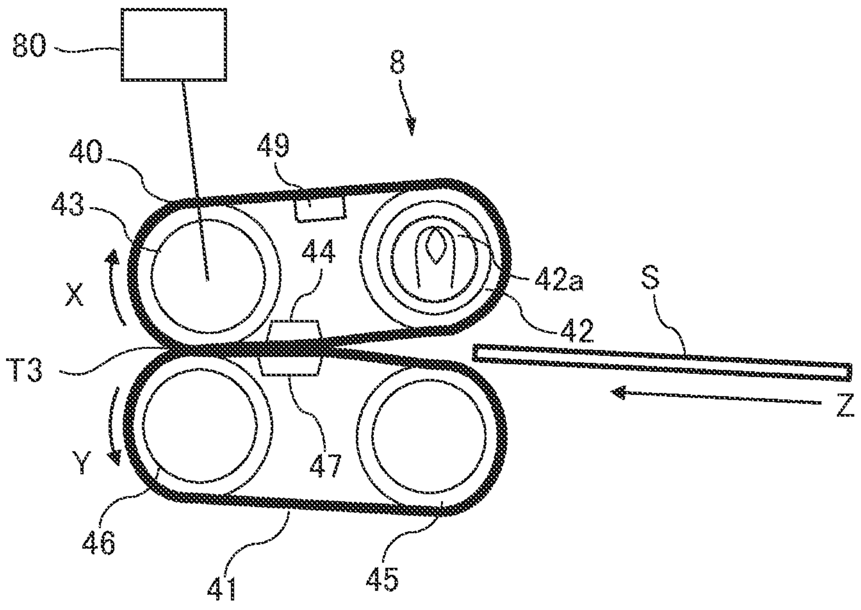
FIG. 2 is a schematic diagram illustrating a fixing apparatus.

The fixing belt 40 is driven to rotate in an arrow X direction of FIG. 2 by the driving roller 43 being driven to rotate by the motor 80 at least when executing the image forming process. A rotational speed of the fixing belt 40 is set to a peripheral speed slightly slower than the conveyance speed of the recording material S conveyed from the image forming unit to form an image on the recording material S before reaching the fixing nip portion T3. Meanwhile, the pressing belt 41 is rotated in the arrow Y direction, following the movement of the fixing belt 40.

In a state where the fixing belt 40 is heated to a predetermined fixing temperature and subjected to temperature control, the recording material S on which an unfixed toner image is formed is conveyed to the fixing nip portion T3 between the fixing belt 40 and the pressing belt 41. A surface of the recording malarial S bearing an unfixed toner image is introduced toward the fixing belt 40. Then, the unfixed toner image of the recording material S is nipped and conveyed while being in close contact with the outer circumference surface of the fixing belt 40, and in that state, heat is mainly applied from the fixing belt 40 and pressure is applied from both the fixing belt 40 and the pressing belt 41, according to which a toner image is fixed to the surface of the recording malarial S.

Further, since the driving roller 43 is an elastic roller having a rubber layer and the pressure tension roller 46 within the pressing belt 41 is a rigid roller made of iron alloy, the deformation of the driving roller 43 is great at the exit of the fixing nip portion T3 between the fixing belt 40 and the pressing belt 41. As a result, the recording malarial S bearing the toner image is self-stripped from the fixing belt 40 due to its own stiffness.

As described above, by supplying a predetermined heating value to the toner on the recording material S, the toner is fixed to the recording material S. Further, the wax contained in the toner is deposited on the toner surface by the heating value supplied to the toner, by which glossiness is applied to the toner. Therefore, the fixing temperature or the conveyance speed of the recording material S must be varied according to the heat capacity of the recording material S. For example, plain paper, thick paper, and coated paper are typical examples of the recording material S formed of general paper. Since these papers have different surface characteristics, density, and grammage (g/m$^2$), there is a need to change the fixing temperature or the conveyance speed of the recording material S according to the grammage of the recording material S.

Plain paper is a paper having a grammage of 50 to 100 g/m$^2$ with no surface coating applied thereto and that is used as a general copying paper or printing paper on which documents are printed in offices. Thick paper is a paper having a grammage of 100 g/m$^2$ or higher with no surface coating applied thereto. Coated paper is a paper of any grammage that has its surface coated smoothly and that is used as a recording material of printed matter required to have glossiness.

Varnish Coater

Next, the varnish coater 200 will be described. An example of using an ultraviolet-curing type UV varnish, which is a varnish cured by ultraviolet radiation is described. As illustrated in FIG. 1, the varnish coater 200 includes a varnish storage tank 208 that stores varnish liquid, a heater 209 that heats varnish liquid stored in the varnish storage tank 208, and a varnish application unit 210 that applies varnish to the recording material S by receiving varnish supply from the varnish storage tank 208. The varnish application unit 210 includes a varnish application roller 201 and a counter roller 202 serving as an application unit for forming a varnish application nip portion T4 for applying varnish on the recording material S, and an ultraviolet radiation lamp 203 serving as an irradiation unit for curing varnish applied to the recording material S. Further, although not shown, the varnish application unit 210 includes a pressurization mechanism that urges the varnish application roller 201 and the counter roller 202 toward each other, and a supplying mechanism that supplies varnish from the varnish storage tank 208 serving as a storage container to the varnish application roller 201.

The varnish application roller 201 is formed to have a dimension capable of applying varnish supplied from the varnish storage tank 208 across the entire area of the recording material S in a longitudinal width direction that is orthogonal to the conveyance direction. The ultraviolet radiation lamp 203 irradiates the recording material S on which varnish is applied by the varnish application roller 201 with UV light having a wavelength corresponding to varnish, to thereby cure the varnish. The ultraviolet radiation lamp 203 is disposed to irradiate ultraviolet radiation, i.e., UV light, to approximately the entire area of the recording material S in the longitudinal width direction, similar to the varnish application roller 201.

Further, the varnish coater 200 includes a first conveyance unit 220 and a second conveyance unit 225 for conveying the recording material S. The interior of the varnish coater 200 is divided into a varnish application route 205 through which the recording material S is conveyed through the varnish application unit 210, and a varnish bypath route 204 through which the recording material S is conveyed without passing through the varnish application unit 210. A switching unit 206 is provided to switch the conveyance path of the recording material S between the varnish application route 205 and the varnish bypath route 204. Mat is, in a case where the path is switched to the varnish application route 205 by the switching unit 206, the recording material S is conveyed to the varnish application unit 210 by the first conveyance unit 220, such that varnish is applied to the recording material S before the recording material S is discharged. Meanwhile, in a case where the path is switched to the varnish bypath route 204 by the switching unit 206, the recording material S will not be conveyed to the varnish application unit 210 by the second conveyance unit 225, such that the recording material S mill be discharged without having varnish applied thereto.

The application unit for applying varnish to the recording material S is not limited to the use of a roller method using the varnish application roller 201 and the counter roller 202, and the use of an inkjet method using line heads is also possible. When using line heads, the varnish is not only applied to the entire surface of the recording material S but also used to form a varnish image such as characters and figures on an arbitrary position on the recording material S. Further, a UV-curing type varnish is illustrated as an example of varnish, but other types of varnish such as oil varnish and aqueous varnish can also be used. However, when oil varnish or aqueous varnish is used, infrared (IR) lamp is preferably used as a drying unit for drying the varnish, instead of using the ultraviolet radiation lamp 203. Further, varnish can be dried by hot air, or varnish can be dried using both the IR lamp and hot air.

Control Configuration of Image Forming System

Next, a control configuration of the image forming system 1X will be described based on FIG. 3 with reference to FIGS. 1 and 2. In the present embodiment, an example is illustrated in which the printer 100, more specifically, the main control unit 101, manages an operation command to the varnish coater 200 in a centralized manner and performs control thereof. Various devices such as motors and power supplies other than those illustrated in FIG. 3 are connected, but they are not related to the main object of the present invention, such that they are not illustrated and descriptions thereof are omitted.

Figure 3:
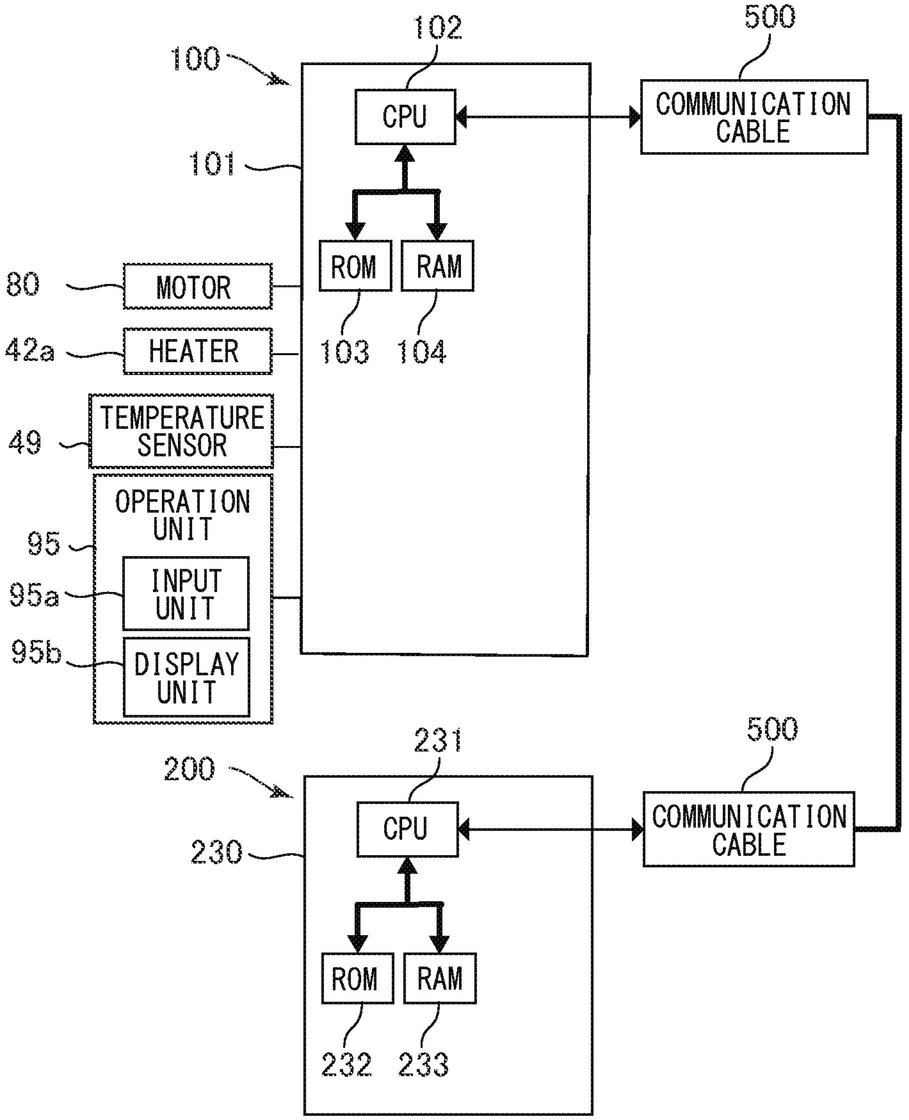
FIG. 3 is a control block diagram of the image forming system.

According to the image forming system 1X of the present embodiment, a varnish application control unit 230 is connected via a communication cable 500 to the main control unit 101 provided in the printer 100, as illustrated in FIG. 3, in a manner capable of mutually communicating operation commands and various data therewith. The varnish application control unit 230 disposed in the varnish coater 200 is operated according to the operation command from the main control unit 101. That is, the main control unit 101 can control the entire image forming system 1X by transmitting operation commands to the varnish coater 200 while controlling the operation of the printer 100.

The main control unit 101 and the varnish application control unit 230 described above can adopt the same configurations. For example, each unit can include a Central Processing Unit (CPU), a Read Only Memory (ROM), and a Random Access Memory (RAM).

The main control unit 101 serving as an example of a controller includes a CPU 102, a ROM 103, and a RAM 104. The ROM 103 and the RAM 104 store various programs such as an image forming control processing (refer to FIG. 4) and recording material selection processing (refer to FIG. 8), and various data such as a fixing condition table (refer to FIG. 7) described below. The RAM 104 can temporarily store calculation processing results accompanying execution of various programs. A varnish application control unit 231 includes a CPU 232, a ROM 233, and a RAM 234. The CPU 232 operates the varnish coater 200 based on a control program stored in the ROM 233.

The motor 80 for driving the driving roller 43 to rotate, the heater 42*a* for heating the heating roller 42, and the temperature sensor 49 for detecting the temperature of the fixing belt 40 are connected to the main control unit 101. The temperature sensor 49 serving as a temperature detection unit transmits detection results, i.e., temperature data, to the main control unit 101. The main control unit 101 can change the temperature of the heater 42*a* according to a predetermined fixing temperature. That is, the temperature of the fixing belt 40 is controlled to be maintained to a predetermined fixing temperature, such as 190° C., by controlling the power supplied to the heater 42*a* on and off by the main control unit 101.

Further according to the present embodiment, the main control unit 101 is configured to change a rotation speed of the motor 80 according to whether varnish is to be applied or not, and to change the conveyance speed of the recording material S during fixing performed at the fixing apparatus 8. This operation will be described below.

The printer 100 includes an operation unit 95 (refer to FIG. 1), and the operation unit 95 is connected to the main control unit 101. The operation unit 95 includes an input unit 95*a* and a display unit 95*h*. The input unit 95*a* is, for example, an operation panel through which the user can instruct execution of various programs such as image forming jobs and enter various data. In a state where a user instruction information indicating whether to apply varnish to the recording material is entered to the input unit 95*a*, the main control unit 101 acquires the user instruction information and controls the varnish coater 200 based on the user instruction information. The display unit 95*h* is, for example, a liquid crystal monitor capable of displaying various screens, such as a print setting screen (refer to FIG. 5 described below), a recording material selection screen (refer to FIG. 6 described below), or a menu screen for displaying various executable programs. Further, the main control unit 101 can acquire image data and various data entered from the external apparatus 91 such as a personal computer. Further, the operation unit 95 serving as a selection unit can be a touch panel capable of displaying various screens on the display unit 95*b* and accept entry of instruction to start various programs or input of various data according to the operation of the user touching the screen.

Although described in detail below, according to the present embodiment, the user can enter whether to apply varnish based on the screen displayed on the display unit 95*b*. In a case where "no varnish application" is entered, the main control unit 101 executes a first image forming job in which toner image is formed on the recording material S but varnish is not applied thereto, and in a case where "varnish application" is entered, the main control unit 101 executes a second image forming job in which toner is formed on the recording material S and varnish is also applied thereto.

Image Forming Control Processing

Next, the image forming control processing according to the present embodiment will be described according to FIGS. 4 to 7 with reference to FIGS. 1, 2, and 3. Although not shown in the drawings, the image forming control processing illustrated here is started 1*w* the main control unit 101 based on the operation of the user pushing a print button on an initial screen displayed on the display unit 95*h*, such as a touch panel.

Figure 4:
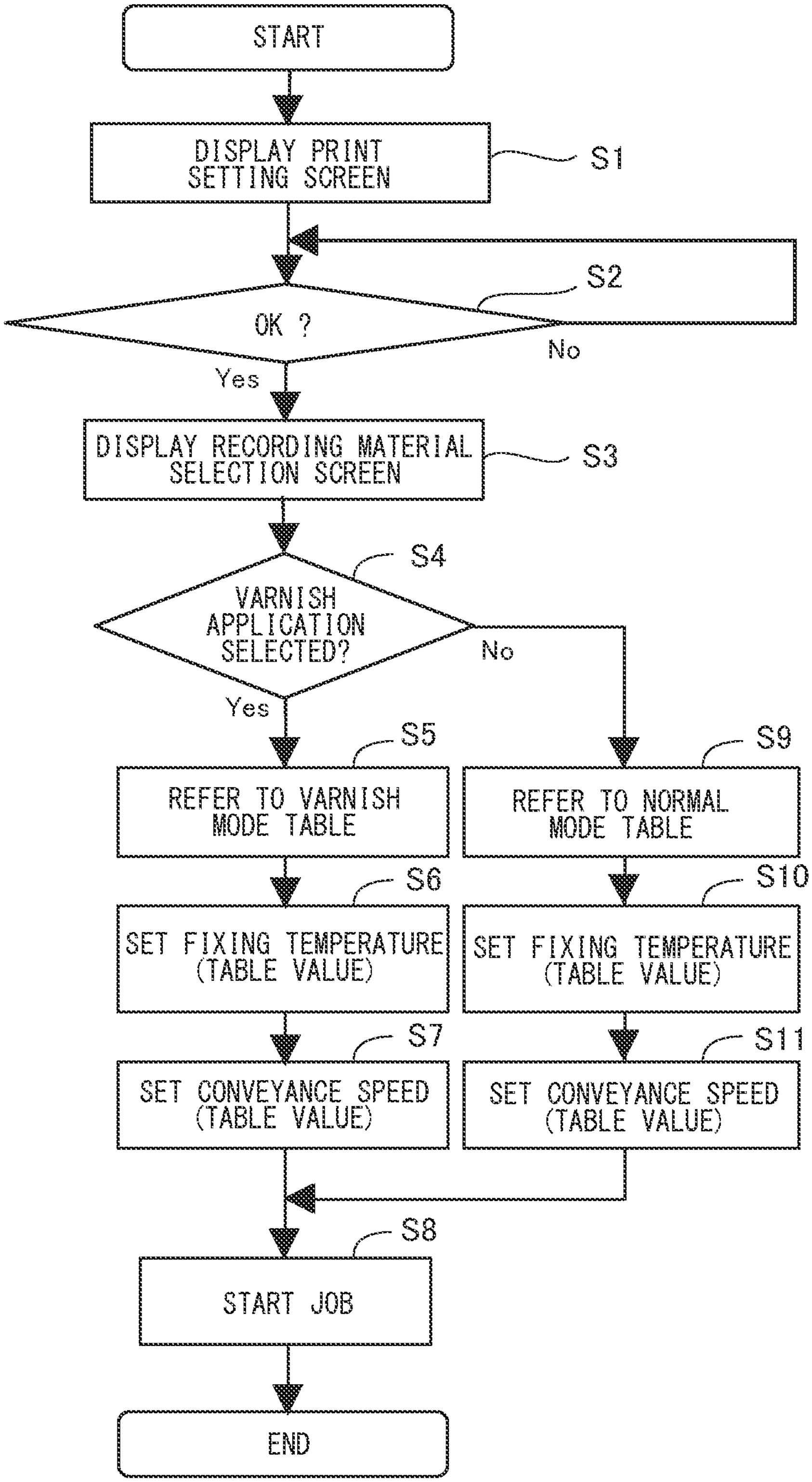
FIG. 4 is a flowchart illustrating an image forming control processing.
Figure 5:
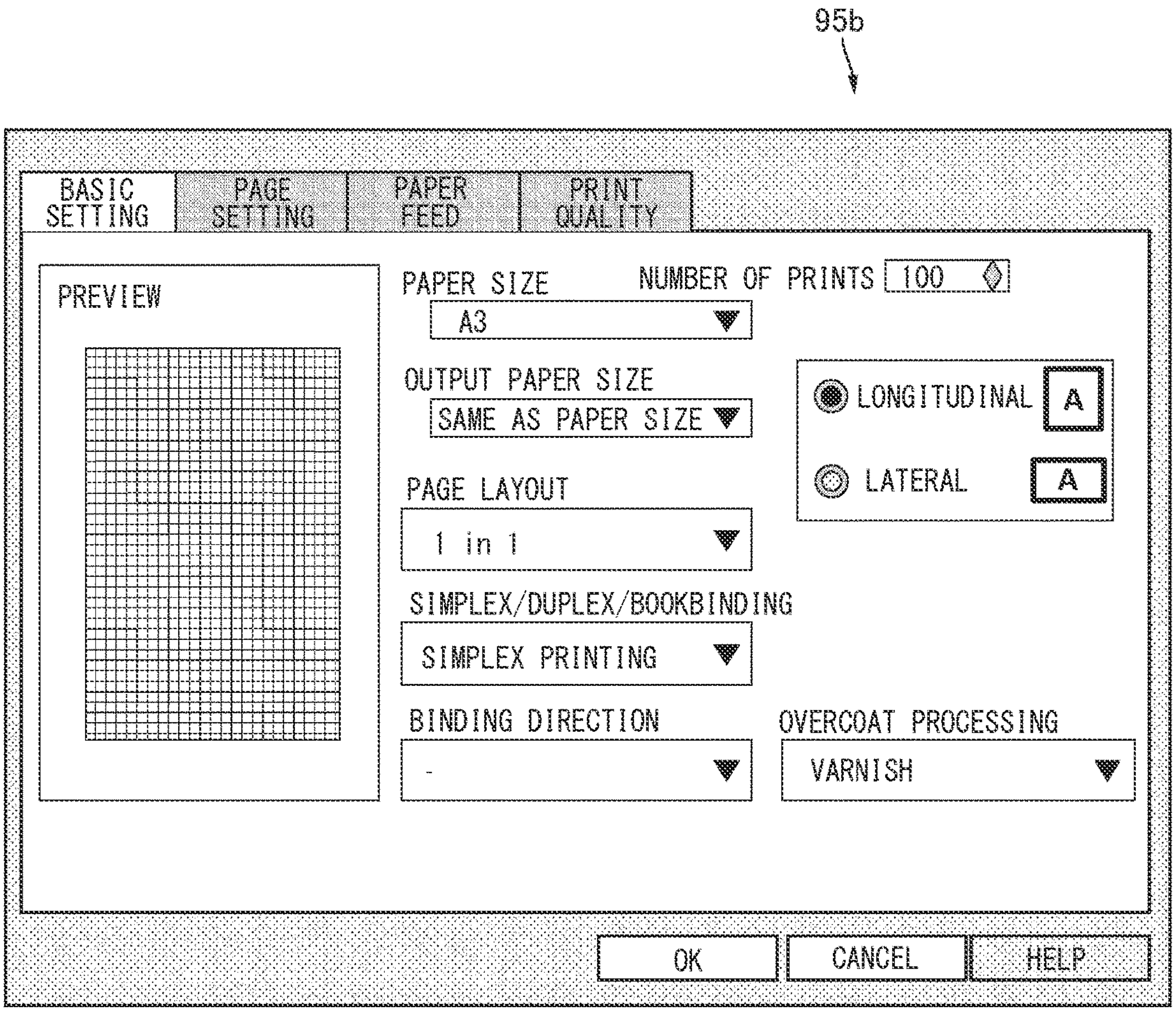
FIG. 5 is a view illustrating a print setting screen.

As illustrated in FIG. 4, the main control unit 101 displays a print setting screen on the display unit 95*b* (S1). The print setting screen is illustrated in FIG. 5. As illustrated in FIG. 5, on the print setting screen, the user can select the size of the recording material S from which image data is entered or to which image data is output, i.e., paper size, a page layout, simplex/duplex/bookbinding printing, binding direction, number of sheets, printing direction (longitudinal or lateral), and whether or not to perform varnish application, i.e., overcoat processing.

The main control unit 101 keeps displaying the print setting screen and stands by for processing until the OK button on the print setting screen is pressed by the user (S2).

In a state where the user sets up the printing conditions, for example by selecting the recording material S on which image is to be formed, and operates the OK button on the print setting screen (S2: Yes), the main control unit 101 displays a recording material selection screen on the display unit 95*b* (S3), if the user operates the cancel button on the print setting screen, the main control unit 101 can change the display on the display unit 95*b* to other screens, such as the initial screen on which the print button mentioned above is displayed.

Figure 6:
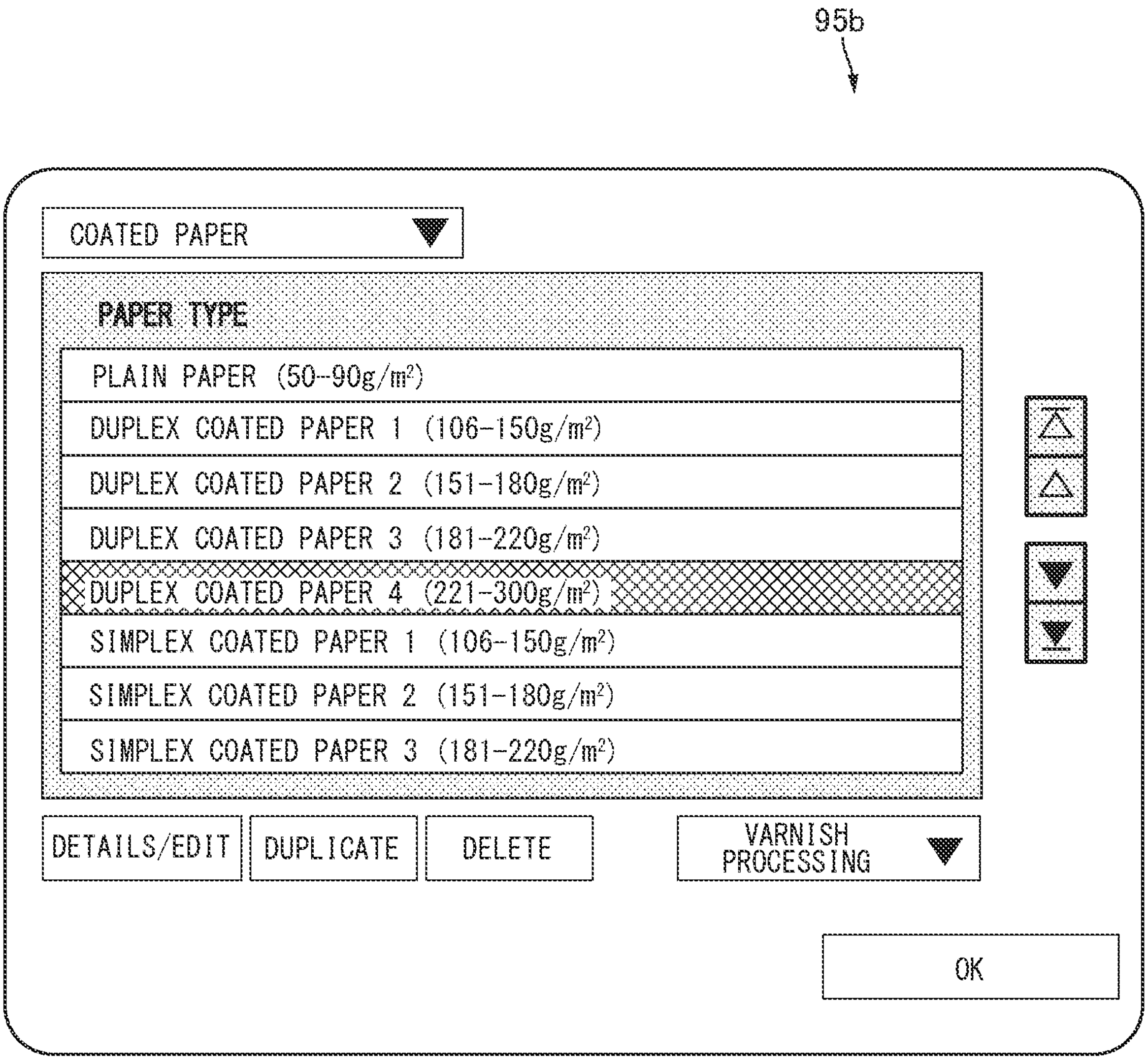
FIG. 6 is a view illustrating a recording material selection screen.

A recording material selection screen is illustrated in FIG. 6. As illustrated in FIG. 6, the recording material selection screen displays a list of recording material types, such as plain paper, duplex coated paper, and simplex coated paper, for each of the different range of grammages of the recording material S that can be selected by the user. Further, an input field for entering whether to apply varnish is displayed in response to the selection of the recording material S from the list of recording material types so that the user can enter whether to perform varnish application to the recording material S. In the input field for entering varnish application, varnish processing is displayed when “varnish application” is selected, and normal is displayed when “no varnish application” is selected. Plain paper has a high varnish permeability, and it is difficult to achieve glossiness by applying varnish. Therefore, when plain paper is selected, the varnish application input field is not displayed, such that the erroneous input by the user selecting varnish application is prevented.

The recording material S on the list displayed as the recording material type described above is set to display a fixing condition table stored in the ROM 103 or the RAM 104, for example. FIG. 7 illustrates the fixing condition table. As illustrated in FIG. 7, paper type of the recording material S is set for respective grammages. In the following description, plain paper and coated paper are taken as examples of paper types of the recording material S, and the paper types are set for respective grammages of the recording material S.

In the fixing condition table, a temperature of the fixing belt 40 is set, which is set when performing fixing at the fixing apparatus 8. In the present embodiment, the temperature of the fixing belt 40 is set to the same tempera ire for both a varnish mode in which “varnish application” is selected, that is, when executing the second image forming job, and a normal mode in which “no varnish application” is selected, that is, when executing the first image forming job. The reason for such setting is that if the fixing temperature is varied between “varnish application” and “no varnish application”, a certain amount of time is required for the fixing belt 40 to reach each fixing temperature accompanying the switching between whether or not to perform the varnish application, such that there is a need to stand by before starting the image forming process, which leads to deteriorated productivity of printed matter.

Further, in the fixing condition table, conveyance speed of the recording material S set during fixing at the fixing apparatus 8 is set for each of the varnish mode in which “varnish application” is selected and the normal mode in which “no varnish application” is selected. That is, in a case where the first image forming job is executed in which a toner image is formed on a first recording material without applying varnish by the varnish coater 200, conveyance of the first recording material at the fixing nip portion T3 is controlled such that a conveyance speed of the first recording material at the fixing nip portion T3 becomes a first conveyance speed, and in a case where the second image forming job is executed in which a toner image is formed on a second recording material which is of the same type, i.e., grammage, as the first recording material, and varnish is applied by the varnish coater 200, a conveyance speed of the recording material S is set such that the conveyance of the second recording material at the fixing nip portion T3 is controlled to a second conveyance speed that is faster the first conveyance speed at the fixing nip portion T3.

For example, in a case where the first image forming job is executed to a coated paper 3 serving as a first recording material having a first grammage of 181 to 220 g/m$^2$, the recording material is conveyed at a first conveyance speed of 160 mm/s, and in a case where the second image forming job is executed to a coated paper 3 serving as a second recording material which is of the same type as, or has the same grammage as, the first recording material, the recording material is conveyed at a second conveyance speed of 250 mm/s. As described, regarding the same type of recording materials 5, the recording material S is conveyed by a faster conveyance speed in the fixing apparatus 8 when “varnish application” is selected compared to the case where “no varnish application” is selected.

Further, in the fixing condition table, a conveyance speed corresponding to respective grammages of the recording material S is set. For example, the conveyance speed of the recording material S is set such that the sheet is conveyed at a third conveyance speed of 250 mm/s that is faster than the first conveyance speed in a case where a first image forming job is executed to a recording material of coated paper 2 having a second grammage of 151 to 180 g/m$^2$ that is smaller than the first grammage, and the sheet is conveyed at a fourth conveyance speed of 350 mm/s that is faster than the second conveyance speed in a case where a second image forming job is executed.

Returning to FIG. 4, the main control unit 101 determines whether the user has selected the recording material S on the recording material selection screen and whether “varnish application” is selected for the selected recording material S (S4). If “varnish application” is selected (S4: Yes), the main control unit 101 refers to a vanish mode table of the fixing condition table described above (S5). The main control unit 101 sets up the temperature of the fixing belt 40 during fixing at the fixing apparatus 8 according to the varnish mode table (S6), and sets up the conveyance speed of the recording material S during fixing at the fixing apparatus 8 (S7). Thereafter, the processing is set to stand by until the instruction to start the image forming job is entered, and based on the instruction to start the image forming job, the image forming job is started (S8).

In this case, since “varnish application” is selected, the main control unit 101 executes the second image forming job. That is, at a matched timing with the starting of the second image forming job, the recording material S is conveyed from the cassette 10 by the conveyance roller 16 and image is formed thereto in the printer 100. The recording material S on which image has been formed is conveyed sequentially after the image forming operation from the printer 100 to the varnish coater 200. The main control unit 101 operates the switching unit 206 such that the recording material S passes through the varnish application route 205. Thereby, the second image forming job of forming a toner image and applying varnish to the recording material S is executed.

Meanwhile, in a case where “no varnish application” is selected (S4: No), the main control unit 101 refers to the normal mode table in the fixing condition table mentioned above (S9). The main control unit 101 sets the temperature of the fixing belt 40 during fixing in the fixing apparatus 8 based on the normal mode table (S10) and sets up the conveyance speed of the recording material S during fixing at the fixing apparatus 8 (S11). Thereafter, the processing is set to stand by until the instruction to start the image forming job is entered, and based on the instruction to start the image forming job, the image forming job is started (S8).

In this case, since "no varnish application" is selected, the main control unit 101 starts the first image forming job. At a matched timing with the starting of first image forming job, the recording material S is conveyed from the cassette 10 by the conveyance roller 16 and image is formed thereto in the printer 100. The recording material S on which image has been formed is conveyed sequentially after the image forming operation from the printer 100 to the varnish coater 200. The main control unit 101 operates the switching unit 206 such that the recording material S passes through the varnish bypath route 204. Thereby, the first image forming job of forming a toner image but applying no varnish to the recording material S is executed.

As described, according to the present embodiment, when executing image forming jobs, the conveyance speed of the recording material S during fixing at the fixing apparatus 8 is set faster when "varnish application" is selected compared to the case where "no varnish application" is selected. Generally, in order to enhance the productivity of printed matter, the conveyance speed of the recording material S should be increased. However, if the conveyance speed of the recording material S during fixing is increased in the printer 100, there may be a case where not enough heating value is applied, such that a recording material S whose glossiness of toner is not achieved may be discharged from the printer 100.

Therefore, according to the present embodiment, the conveyance speed of the recording material S during fixing is increased in the case of a second image forming job in which varnish application is performed. In that case, even if the recording material S whose toner has no glossiness is discharged from the printer 100, varnish application to the recording material S is performed in the varnish coater 200, such that toner is coated by varnish and glossiness of toner is applied by varnish. In other words, even if there is not enough wax deposition and the toner itself has no glossiness, varnish complements the lack of glossiness. As described, in the case of the second image forming job where varnish application is performed, the conveyance speed of the recording material S during fixing is increased to improve the productivity of printed matter, while a printed matter having glossiness added by applying varnish to the recording material S is created. Thereby, the productivity of printed matter can be improved when creating printed matter having glossiness in the image forming system including a printer and a varnish coater.

Further according to the present embodiment, as illustrated in FIG. 8, in a case where a third image forming job is executed in which a toner image is formed on a coated paper 2 serving as a third recording material having a grammage smaller than a coated paper 3 serving as a first recording material with no varnish applied by the varnish coater 200, the min control unit 101 controls the conveyance of the third recording material at the fixing nip portion T3 such that the conveyance speed of the third recording material at the fixing nip portion T3 is set to a third conveyance speed of 250 mm/s that is faster than the first conveyance speed of 160 mm/s. Furthermore, in a case where a fourth image forming job is executed in which a toner image is formed on a coated paper 2 serving as a fourth recording material which is of the same type, for example, grammage, as the third recording material and varnish is applied in the varnish coater 200, the main control unit 101 controls the conveyance of the fourth recording material at the fixing nip portion T3 such that the conveyance speed of the fourth recording material at the fixing nip portion T3 is set to a fourth conveyance speed of 350 mm/s that is faster than the third conveyance speed of 250 mm/s.

Further according to the present embodiment, in a case where the recording material, i.e., coated paper 4, having a third grammage of 221 to 300 g/m$^2$ is conveyed at a first conveyance speed of 160 mm/s during execution of the first image thrilling job, a temperature of the fixing belt 40 set during fixing of the toner image is set to a first temperature of 190° C. Further, in a case where the recording material, i.e., coated paper 3, having a fourth grammage of 181 to 220 g/m$^2$ that is smaller than the third grammage is conveyed at a first conveyance speed during execution of the first image forming job, a temperature of the fixing belt 40 set during fixing of the toner image is set to a second temperature of 180° C. that is lower than the first temperature. Furthermore, in a case where the recording material, i.e., coated paper 4, having a third grammage of 221 to 300 g/m$^2$ is conveyed at a second conveyance speed of 250 mm/s during execution of the second image forming job, a temperature of the fixing belt 40 set during fixing of the toner image is set to a third temperature of 190° C. Further, in a case where the recording material, i.e., coated paper 3, having a fourth grammage of 181 to 220 g/m$^2$ that is smaller than the third grammage is conveyed at a second conveyance speed during execution of the second image forming job, a temperature of the fixing belt 40 set during fixing of the toner image is set to a fourth temperature of 180° C. that is lower than the third temperature. Thereby, the heating value can be adjusted appropriately according to grammage.

Other Embodiments

A fixing temperature according to grammage of the recording material S is set in the fixing condition table (refer to FIG. 7) described above, but the fixing temperature is set so as not to exceed a maximum heating temperature that the heater 42*a* (refer to FIG. 2) is capable of heating, which for example is 195° C. For example, in order to provide glossiness to toner formed on a coated paper 5 having a greater grammage, such as 301 to 500 g/m$^2$, than coated paper 4, a fixing temperature of 200° C. must be set. However, 200° C. is a temperature exceeding the maximum heating temperature of the heater 42*a*, and actually, such heating cannot be realized by the heater 42*a*. Therefore, fixing conditions regarding coated paper 5 is not set in the fixing condition table illustrated in FIG. 7.

According to the above-described embodiment, however, printed matter having glossiness realized by applying varnish to the recording material S can be created. That is, even if a fixing temperature of 200° C. that exceeds the maximum heating temperature of the heater 42*a* is not set for coated paper 5, toner is fixed at a fixing temperature that is as close as possible to the maximum heating temperature of the heater 42*a*, such as 190° C. and varnish application is performed thereto Thereby, a substantially similar level of glossiness can be realized as compared to the case where toner is fixed at a temperature of 200° C. exceeding the maximum heating temperature of the heater 42*a*. A fixing condition table of such a case is illustrated in FIG. 8.

Compared to the fixing condition table illustrated in FIG. 7, the fixing condition table illustrated in FIG. 8 includes a setting of fixing conditions of a varnish mode regarding coated paper 5 having a grammage of 300 to 500 g/m$^2$. The fixing conditions of a normal mode is not set since a fixing temperature exceeding the maximum heating temperature of the heater 42*a* cannot be set as described above. As fixing conditions of the varnish mode, similar to other recording materials S, the temperature of the fixing belt 40 set during fixing at the fixing apparatus 8 and the conveyance speed of the recording material S set during fixing at the fixing apparatus 8 are set. When comparing coated paper 5 and coated paper 4, the fixing temperature is the same 190° C., but the conveyance speed of the recording material S is faster for coated paper 4 having a smaller grammage than coated paper 5.

Figure 9:
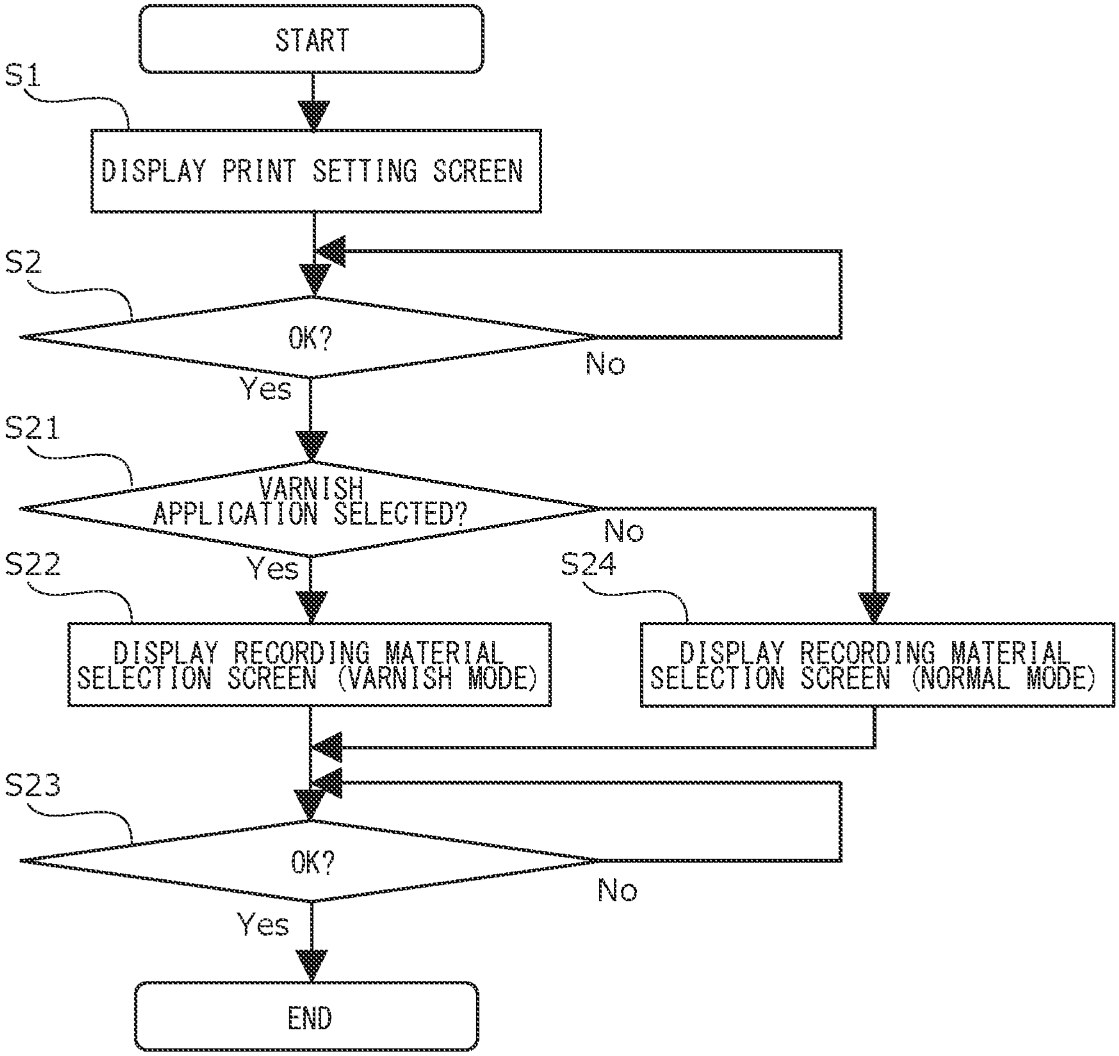
FIG. 9 is a flowchart illustrating another embodiment of an image forming control processing

Next, the image forming control processing using the fixing condition table illustrated in FIG. 8 will be described based on FIGS. 9 to 10B with reference to FIGS. 3 and 8. The image forming control processing illustrated in FIG. 9 is started by the main control twin 101 in response to the user operating the printing button on the initial screen (not shown) displayed on the display unit 95*h*, for example. In the following description, description regarding similar processes as the image forming control processing illustrated in FIG. 4 will be brief or omitted.

As illustrated in FIG. 9, the main control unit 101 displays the print setting screen (refer to FIG. 5) on the display unit 95*b* (S1). The main control unit 101 stands by for processing while displaying the print setting screen until the OK button on the print setting screen is operated by the user (S2). In a state where the OK button on the print setting screen is operated by the user (S2: Yes), the main control unit 101 determines whether "varnish application" is selected on the print setting screen (S21).

If "varnish application" is selected (S21: Yes), the main control unit 101 refers to the varnish mode table on the fixing condition table illustrated in FIG. 8 and displays the recording material selection screen for the varnish mode (refer to FIG. 10B) on the display unit 95*b* (S22). Meanwhile, if "no varnish application" is selected (S21: No), the main control unit 101 refers to the normal mode table of the fixing condition table illustrated in FIG. 8 and displays the recording material selection screen for the normal mode (refer to FIG. 10A) on the display unit (S24).

Then, the main control unit 101 stands by for processing while displaying the recording material selection screen until the OK button on the recording material selection screen is operated by the user (S23). In a state where the OK button on the recording material selection screen is operated by the user (S23: Yes), the main control unit 101 sets the temperature of the fixing belt 40 during fixing at the fixing apparatus 8 and the conveyance speed of the recording material S during fixing based on the respective mode tables, although not shown. Thereafter, the main control unit 101 stands by for processing until an instruction to start the image forming job is entered, and starts the image forming job in response to the instruction to start the image forming job.

Figure 10A:
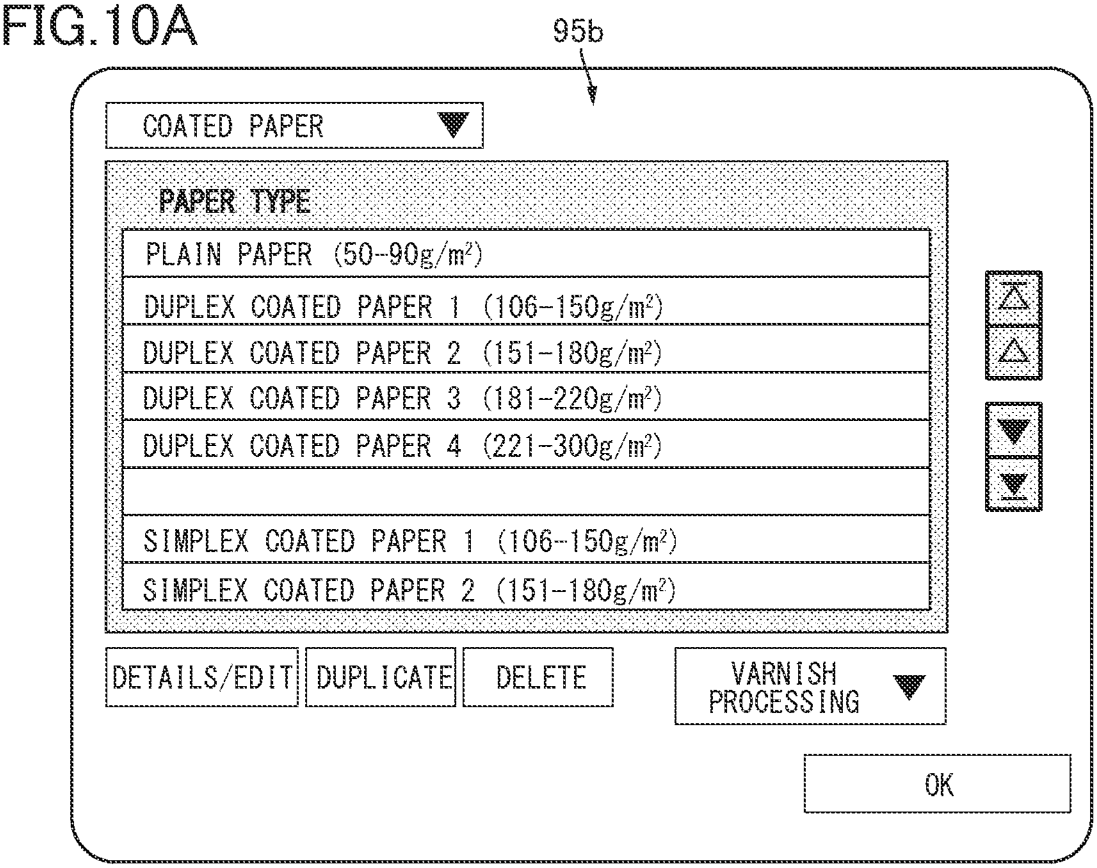
FIG. 10A is a view illustrating a recording material selection screen of a case where "no varnish application" is selected.

The recording material selection screen for the normal mode is illustrated in FIG. 10A. As illustrated in FIG. 10A, on the recording material selection screen for normal mode, the user cannot select coated paper 5 for which the fixing temperature and the conveyance speed are not set in the fixing condition table illustrated in FIG. 8. That is, when executing the first image forming job, the user is capable of selecting coated paper 1 to coated paper 4 having a first maximum grammage of 221 to 300 g/m$^2$, such that coated papers 1 to 4 not exceeding the first maximum grammage are displayed in a selectable manner. Coated paper 5 is not displayed such that the user cannot select the coated paper 5 having a grammage greater than the first maximum grammage and not greater than the second maximum grammage, as can be recognized with comparison to FIG. 10B.

The non-selectable choice that the user cannot select on the recording material selection screen is not limited to being not displayed as described above. For example, according to the coated paper 5 described above, the characters "duplex coated paper 5 (301-350 g/m$^2$)" can be displayed as a gray-out display, or the background color thereof can be displayed as a gray-out display. In that case, even if the user touches the software key corresponding to coated paper 5, the user cannot select the coated paper 5. In other words, the software key whose characters or background color is shown as a gray-out display cannot be operated even when the user touches the key.

Figure 10B:
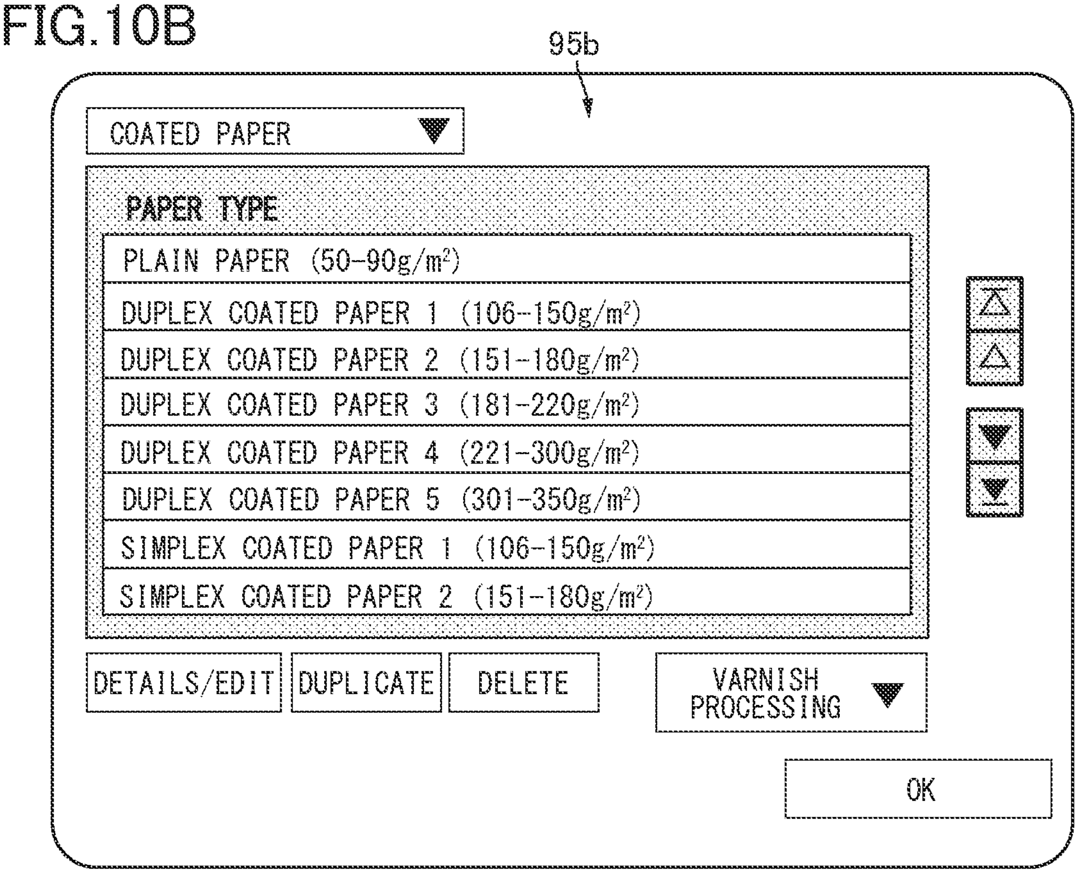
FIG. 10B is a view illustrating a recording material selection screen of a case where "varnish application" is selected.

The recording material selection screen for the varnish mode is illustrated in FIG. As illustrated in FIG. 10B, on the recording material selection screen for the varnish mode, the user can select the coated paper 5 for which the fixing temperature and the conveyance speed are set similar to other papers in the fixing condition table illustrated in FIG. 8. In other words, when executing the second image forming job, the coated paper 5 having a second maximum grammage of 301 to 350 g/m$^2$ can also be selected, such that the coated paper not exceeding the second maximum grammage is displayed in a selectable manner. Further, when executing the second image forming job, the coated paper 4 having a first maximum grammage is conveyed at a fifth conveyance speed of 250 mm/s, while the coated paper 5 having a second maximum grammage is conveyed at a sixth conveyance speed of 160 mm/s which is slower than the fifth conveyance speed. Thereby, a greater healing value can be applied during fixing to the recording material having a greater grammage.

In the manner described above, printed matter having glossiness applied thereto can be created using the recording material S having such a grammage that could not have been printed heretofore by the normal mode by applying varnish to the recording material S.

According to the present technique, productivity of printed matter can be improved when creating printed matter having glossiness in an image forming apparatus including an image forming unit and a varnish coating apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No, 2021-172135, filed Oct. 21, 2021, which is hereby incorporated by reference herein in its entirety,

What is claimed is:

1. An image forming apparatus comprising:

an image forming unit configured to form a toner image on a recording material;

a fixing unit configured to fix the toner image on the recording material at a fixing nip portion in which the recording material is nipped and conveyed; and a varnish coater configured to apply varnish to the recording material passed through the fixing nip portion, wherein, in a case where a first image forming job in which a toner image is formed to a first recording material and varnish is not applied by the varnish coater is executed, the first recording material is conveyed at the fixing nip portion at a first conveyance speed, wherein, in a case where a second image forming job in which a toner image is formed to a second recording material of which a grammage is the same as a grammage of the first recording material and varnish is applied by the varnish coater is executed, the second recording material is conveyed at the fixing nip portion at a second conveyance speed, and wherein the second conveyance speed is faster than the first conveyance speed.

2. The image forming apparatus according to claim 1, wherein the fixing unit includes a first rotary member, a second rotary member that forms the fixing nip portion by contacting with the first rotary member, a heater configured to heat the first rotary member, and a temperature detection unit configured to detect a temperature of the first rotary member, and wherein a controller is configured to control the heater such that a temperature of the first rotary member is set to a same temperature during execution of the first image forming job and during execution of the second image forming job.

3. The image forming apparatus according to claim 1, wherein a controller is configured to acquire user instruction information indicating whether to perform varnish application to a recording material and to control the varnish coater based on the user instruction information.

4. The image forming apparatus according to claim 3, further comprising an input unit through which the user instruction information is entered.

5. The image forming apparatus according to claim 1, wherein, in a case where a third image forming job in which a toner image is formed to a third recording material having a smaller grammage than the first recording material and varnish is not applied by the varnish coater is executed, the third recording material is conveyed at the fixing nip portion at a third conveyance speed, wherein, in a case where a fourth image forming job in which a toner image is formed to a fourth recording material of which a grammage is the same as a grammage of the third recording material and varnish is applied by the varnish coater is executed, the fourth recording material is conveyed at the fixing nip portion at a fourth conveyance speed, and wherein the third conveyance speed is faster than the first conveyance speed and the fourth conveyance speed is faster than the third conveyance speed.

6. The image forming apparatus according to claim 1, wherein the varnish is an ultraviolet-curing type varnish, and wherein the varnish coater includes an application unit configured to apply varnish to a recording material and an irradiation unit configured to irradiate ultraviolet radiation to varnish applied to the recording material.

* * * * *